(12) United States Patent
Fujii

(10) Patent No.: US 7,298,729 B2
(45) Date of Patent: Nov. 20, 2007

(54) RADIO COMMUNICATION SYSTEM AND DESTINATION PORTABLE TERMINAL TIME IDENTIFICATION METHOD

(75) Inventor: Toshiaki Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 1070 days.

(21) Appl. No.: 10/321,486

(22) Filed: Dec. 18, 2002

(65) Prior Publication Data

US 2003/0117994 A1    Jun. 26, 2003

(30) Foreign Application Priority Data

Dec. 20, 2001    (JP) .............................. 2001-387894

(51) Int. Cl.
*H04J 3/24* (2006.01)
(52) U.S. Cl. .................................... 370/349; 455/456.1
(58) Field of Classification Search .................... None
See application file for complete search history.

(56) References Cited

U.S. PATENT DOCUMENTS

| 5,920,824 A | 7/1999 | Beatty et al. |
| 5,974,330 A * | 10/1999 | Negishi ....................... 455/457 |
| 6,751,483 B1 * | 6/2004 | Oh .............................. 455/566 |
| 6,952,581 B2 * | 10/2005 | Sasada et al. ............ 455/432.3 |
| 6,985,744 B2 * | 1/2006 | Katagishi et al. ........ 455/456.1 |

FOREIGN PATENT DOCUMENTS

| EP | 1 037 447 A2 | 9/2000 |
| GB | 2 347 313 A | 8/2000 |
| JP | 2002-335336 A | 11/2002 |
| WO | WO 01/82638 A1 | 11/2001 |

* cited by examiner

*Primary Examiner*—Huy D. Vu
*Assistant Examiner*—Toan Nguyen
(74) *Attorney, Agent, or Firm*—Sughrue Mion Pllc.

(57) ABSTRACT

The present invention relates to a radio communication system and destination portable terminal time identification method capable of identifying the time of a destination portable telephone terminal in advance by an originating portable telephone terminal.

8 Claims, 10 Drawing Sheets

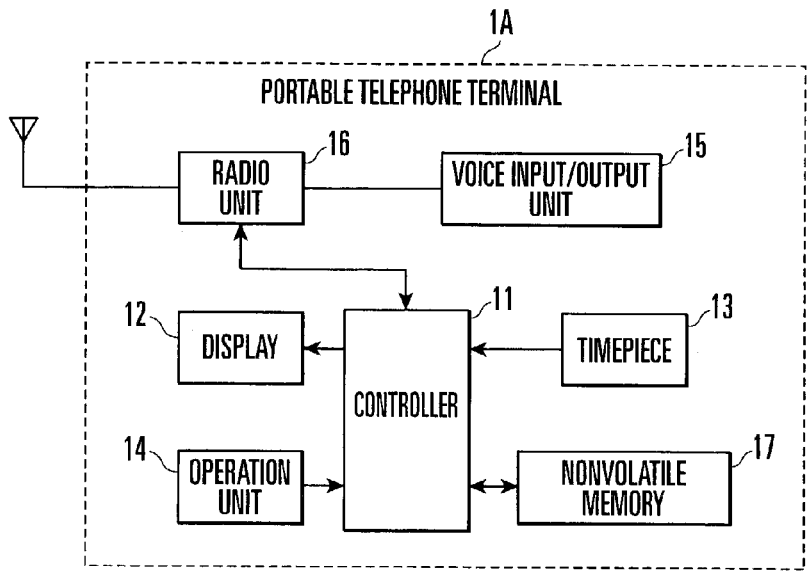

FIG. 2

| TERMINAL IDENTIFIER | POSITION INFORMATION | TIME ZONE |
|---|---|---|
| PORTABLE TELEPHONE TERMINAL 1A | BASE STATION 3A | |
| PORTABLE TELEPHONE TERMINAL 1B | BASE STATION 3B | |
| PORTABLE TELEPHONE TERMINAL 1C | SWITCHING NETWORK 2B | +3 |
| PORTABLE TELEPHONE TERMINAL 1D | DEAD SPACE | |
| ⋮ | ⋮ | ⋮ |
| PORTABLE TELEPHONE TERMINAL 1N | BASE STATION 3X | |

FIG. 3A

| BASE STATION IDENTIFIER | TIME ZONE |
|---|---|
| BASE STATION 3A | +9 |
| BASE STATION 3B | +8 |
| ⋮ | ⋮ |
| BASE STATION 3X | +9 |

FIG. 3B

| TERMINAL-SPECIFIC IDENTIFIER | SWITCHING NETWORK IDENTIFIER |
|---|---|
| ID1 | ID2 |

FIG. 3C

RADIO COMMUNICATION SYSTEM AND DESTINATION PORTABLE TERMINAL TIME IDENTIFICATION METHOD

BACKGROUND OF THE INVENTION

The present invention relates to a radio communication system and destination portable terminal time identification method capable of identifying the time of a destination portable telephone terminal in advance by an originating portable telephone terminal.

In wire telephone terminals and telephone networks, a telephone number containing a toll number is assigned in association with an area where a telephone terminal is installed. For international direct distance dialing, the preassigned country code of a destination must be dialed. In wire telephone terminals, their installation locations are fixed, and telephone numbers are assigned in correspondence with the installation locations. In calling a destination telephone terminal, the area and time zone (time difference) where the destination telephone terminal exists must be identified from the destination telephone number containing a toll number and country code.

In a so-called portable telephone system in which a telephone terminal and base station are connected by radio and communicate with each other, a portable telephone terminal can move geographically. For this reason, an area where the portable telephone terminal is located cannot be identified from a telephone number assigned to the portable telephone terminal. In calling a portable telephone terminal usable over a plurality of countries by so-called international roaming or the like, the originating side cannot determine the origination time in consideration of the time difference from the terminating portable telephone terminal in advance. The same problem occurs in a country such as USA which has a plurality of time zones.

SUMMARY OF THE INVENTION

It is an object of the present invention to provide a radio communication system and destination portable terminal time identification method capable of identifying by an originating radio terminal the current time of a terminating portable telephone terminal which moves over a plurality of time zones.

To achieve the above object, according to the present invention, there is provided a radio communication system comprising first and second portable terminals each of which is assigned a unique identifier and has a display for displaying time information and time difference information and a timepiece for measuring current time, and a first switching network having first and second base stations which are assigned unique identifiers and perform radio communication with the first and second portable terminals, a first switching unit connected to the first and second base stations, a first database which stores positions of the first and second portable terminals in association with positions of the first and second base stations, and a second database which stores pieces of time difference information of the first and second base stations, wherein the first portable terminal comprises time difference acquisition request means for adding the identifier of the second portable terminal and issuing a time difference acquisition request for the second portable terminal to the first base station when the second portable terminal connected to the second base station is to be called via the first base station, and current time calculation means for calculating current time of the second portable terminal on the basis of time difference information sent from the first base station in response to the time difference acquisition request from the time difference acquisition request means and time information from the timepiece, and outputting the current time of the second portable terminal to the display, the first base station adds the identifier of the first base station to the time difference acquisition request containing a terminal identifier received from the first portable terminal and transmits the time difference acquisition request to the first switching unit, and the first switching unit comprises first time difference acquisition means for acquiring the time difference information of the first base station from the second database on the basis of the identifier of the first base station contained in the time difference acquisition request received from the first base station, position information acquisition means for acquiring position information of the second base station containing a base station identifier from the first database on the basis of the identifier of the second portable terminal contained in the time difference acquisition request received from the first base station, second time difference acquisition means for acquiring the time difference information of the second base station from the second database on the basis of the base station identifier contained in the position information of the second base station output from the position information acquisition means, and time difference calculation means for calculating a time difference between the first and second base stations by using pieces of time difference information output from the first and second time difference acquisition means, and transmitting a calculation result to the first portable terminal via the first base station.

BRIEF DESCRIPTION OF THE DRAWINGS

FIG. 2 is a block diagram showing a portable telephone terminal in FIG. 1;

FIG. 3A is a table showing the registration status of various pieces of information in a position information DB in FIG. 1;

FIG. 3B is a table showing the registration status of various pieces of information in a base station information DB in FIG. 1;

FIG. 3C is a view showing identifier information stored in a nonvolatile memory in FIG. 2;

DESCRIPTION OF THE PREFERRED EMBODIMENT

The present invention will be described in detail below with reference to the accompanying drawings.

Figure 1:
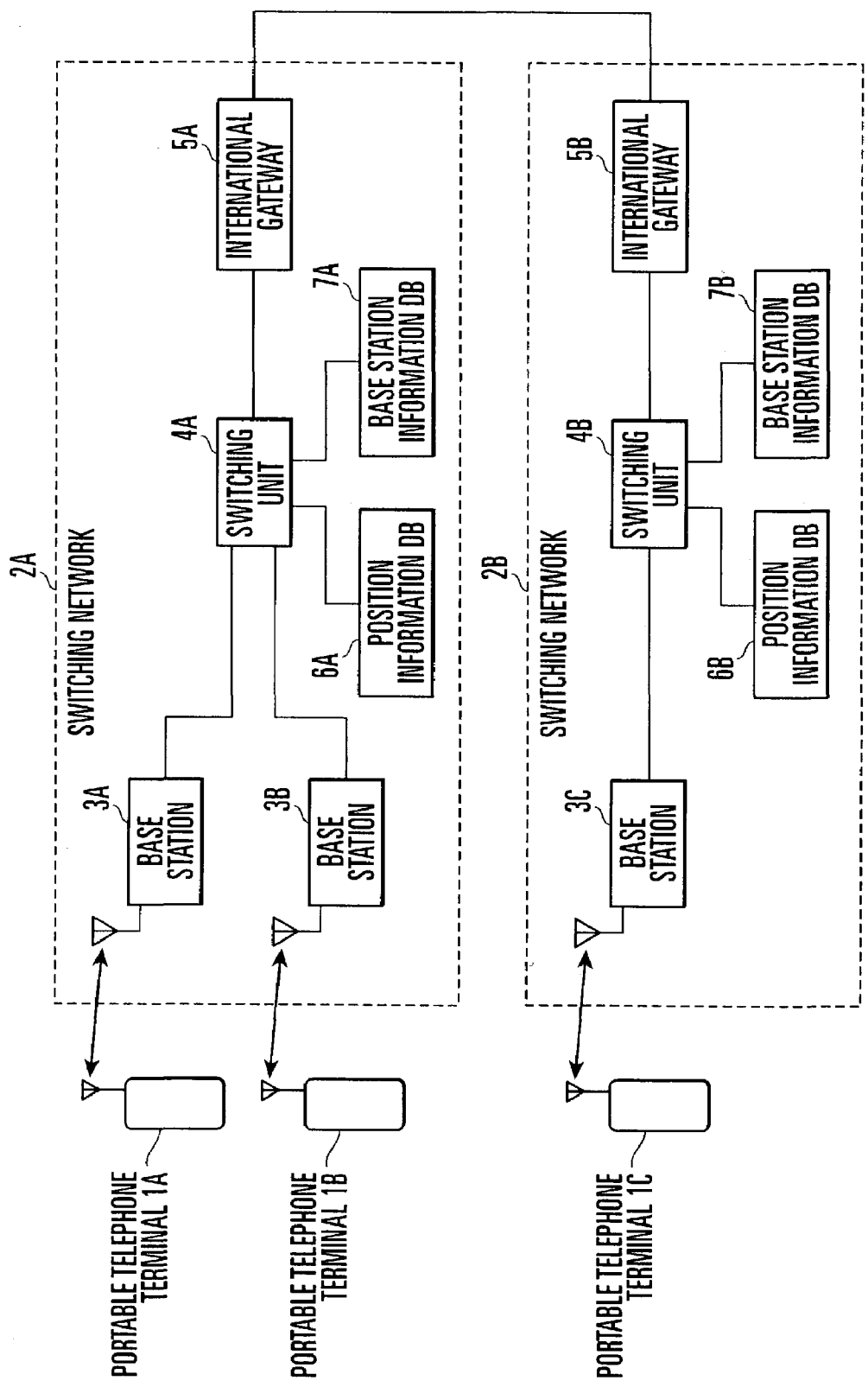
FIG. 1 is a block diagram showing a portable telephone system according to an embodiment of the present invention.

As shown in FIG. 1, a portable telephone system according to an embodiment is constituted by a plurality of portable telephone terminals 1A to 1C, and a plurality of switching networks 2A and 2B which perform telephone switching between the portable telephone terminals 1A to 1C.

The switching network 2A is comprised of base stations 3A and 3B which perform radio communication between the portable telephone terminals 1A and 1B belonging to them, a switching unit 4A which is connected to the base stations 3A and 3B and switches between the portable telephone terminals 1A and 1B, a position information database (to be referred to as a position information DB hereinafter) 6A which stores information representing which base station is connected to the portable telephone terminals 1A and 1B, a base station information database (to be referred to as a base station information DB hereinafter) 7A which stores time zone information about locations where the base stations 3A and 3B are installed, and an international gateway 5A. In this case, the users of the portable telephone terminals 1A and 1B have made a contract with a carrier who provides the switching network 2A for service offering.

The switching network 2B is comprised of a base station 3C which performs radio communication with the portable telephone terminal 1C belonging to it, a switching unit 4B, a position information DB 6B which stores position information of the portable telephone terminal 1C, the switching unit 4B which is connected to the base station 3C and switches the portable telephone terminal 1C, a base station information DB 7B which stores time zone information about a location where the base station 3C is installed, and an international gateway 5B. The different switching networks 2A and 2B are connected by connecting the international gateways 5A and 5B. Similarly, a plurality of switching networks including the switching networks 2A and 2B are arbitrarily connected by connecting the international gateways of the respective switching networks.

As shown in FIG. 2, the portable telephone terminal 1A comprises a controller 11 which controls the whole operation of the portable telephone terminal 1A, a display 12 which displays various pieces of information, a timepiece 13 which maintains and measures the time, an operation unit 14 which receives user's operation, a voice input/output unit 15 which inputs/outputs a voice signal, a radio unit 16 which performs radio communication with the base station, and a nonvolatile memory 17 which stores the identifier (telephone number) of the portable telephone terminal 1A and the identifier of the switching network 2A to which the portable telephone terminal 1A belongs. The portable telephone terminals 1B to 1D also have the same arrangement as that of the portable telephone terminal 1A.

As shown in FIG. 3A, the position information DB 6 stores pieces of position information of the portable telephone terminals 1A to 1D for respective terminal identifiers assigned to the portable telephone terminals 1A to 1D in correspondence with each other. As pieces of position information of the portable telephone terminals 1A to 1D stored in the position information DB 6, the identifiers of the base stations 3A and 3B are stored while the portable telephone terminals 1A and 1B are connected to the base stations 3A and 3B, and dead space information is stored while no portable telephone terminal is connected to the base stations 3A to 3C. While a portable telephone terminal is connected to the switching network 2B, the identifier of the connected switching network 2B is stored.

If information about a portable telephone terminal connected to the switching network 2B is stored, time zone information of an area where the portable telephone terminal 1C exists at present is stored in the position information DB 6 on the basis of the time difference from the international standard time. The position information DB 6 allows information retrieval using the terminal identifier as a key.

As shown in FIG. 3B, the base station information DB 7 stores pieces of time zone information for respective identifiers unique to the base stations 3A to 3C in correspondence with each other. As time zone information stored in the base station information DB 7A, pieces of time zone information of areas where the base stations 3A to 3C are installed are stored based on time differences from the international standard time. The base station information DB 7 allows information retrieval using the base station identifier as a key.

<Destination Terminal Time Difference Inquiry Operation>

Figure 4:
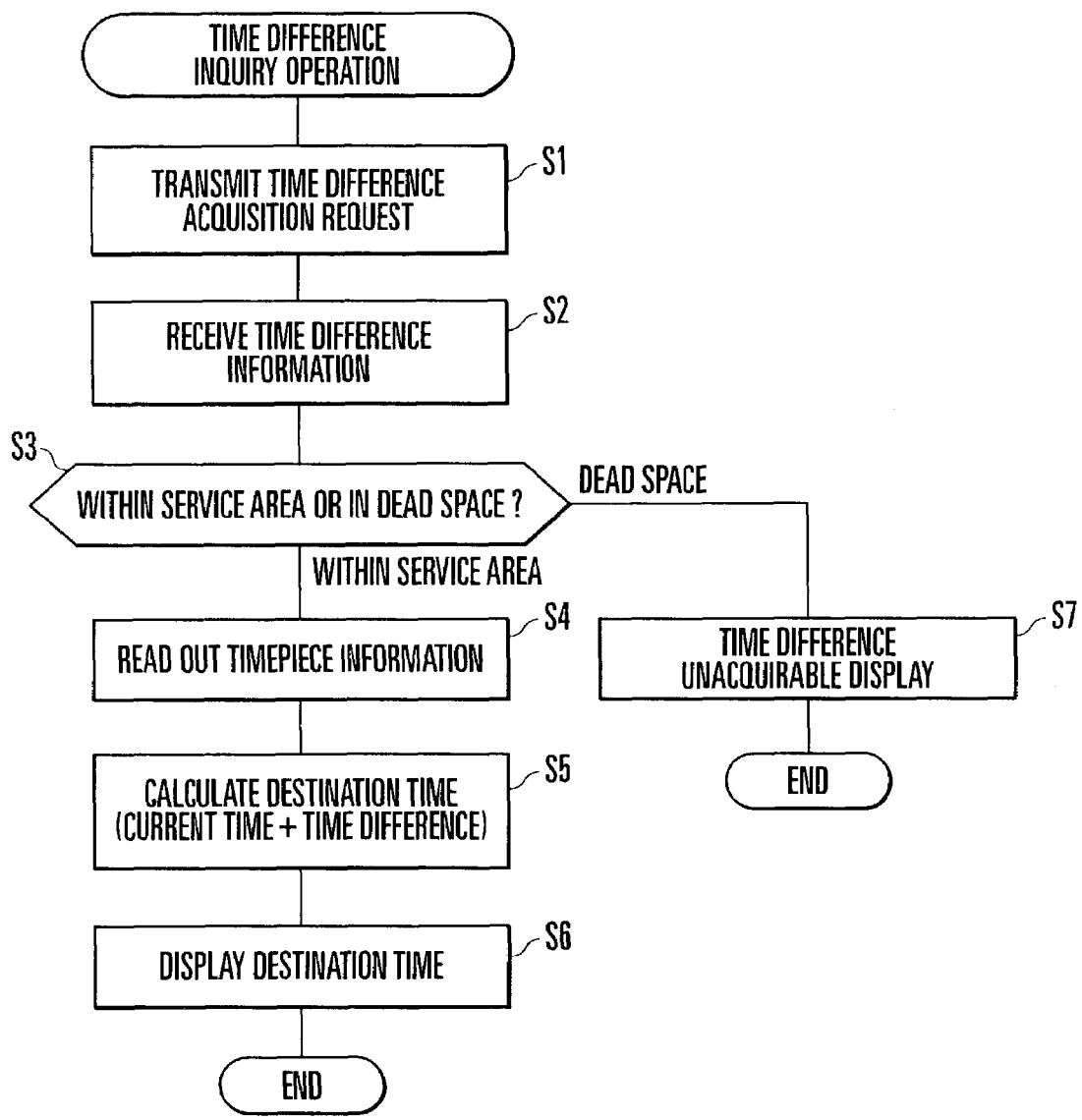
FIG. 4 is a flow chart showing destination time difference inquiry operation by the portable telephone system in FIG. 1.

Time difference inquiry operation for a destination portable telephone terminal by the portable telephone terminal 1A will be explained with reference to FIG. 4. Operations are controlled by the controller 11 of the portable telephone terminal 1A.

If the user of the portable telephone terminal 1A manipulates the operation unit 14 to input the telephone number of a destination portable telephone terminal (to be referred to as a destination terminal hereinafter), the controller 11 transmits a time difference acquisition request to the base station 3A (step S1). At this time, the time difference acquisition request contains the telephone number of the destination terminal input by the user.

The portable telephone terminal 1A receives time difference information transmitted from the base station 3A in response to the time difference acquisition request (step S2). If the base station 3A which has received the time difference acquisition request finds the position of the destination terminal, the base station 3A transmits time difference information of the destination terminal to the portable telephone terminal 1A. If the base station 3A cannot find the position of the destination terminal, the base station 3A notifies the requesting portable telephone terminal 1A of a failure in acquiring time difference information.

The controller 11 of the portable telephone terminal 1A which has received the time difference information checks based on the information transmitted from the base station 3A whether the position of the destination terminal is within the service area or in the dead space (step S3). If the position of the destination terminal is within the service area, the controller 11 reads out the current time from the timepiece 13 (step S4), and adds the readout current time and the time difference from the destination terminal that has been acquired from the base station 3A, thereby obtaining the current time of the destination terminal (step S5). The controller 11 then displays the current time of the destination terminal on the display 12 (step S6). If the position of the destination terminal is in the dead space in step S3, the controller 11 displays a time difference unacquirable display on the display 12 (step S7). The time difference unacquirable display is, e.g., an error message that acquisition of the time difference fails.

<Position Registration Operation>

Figure 5:
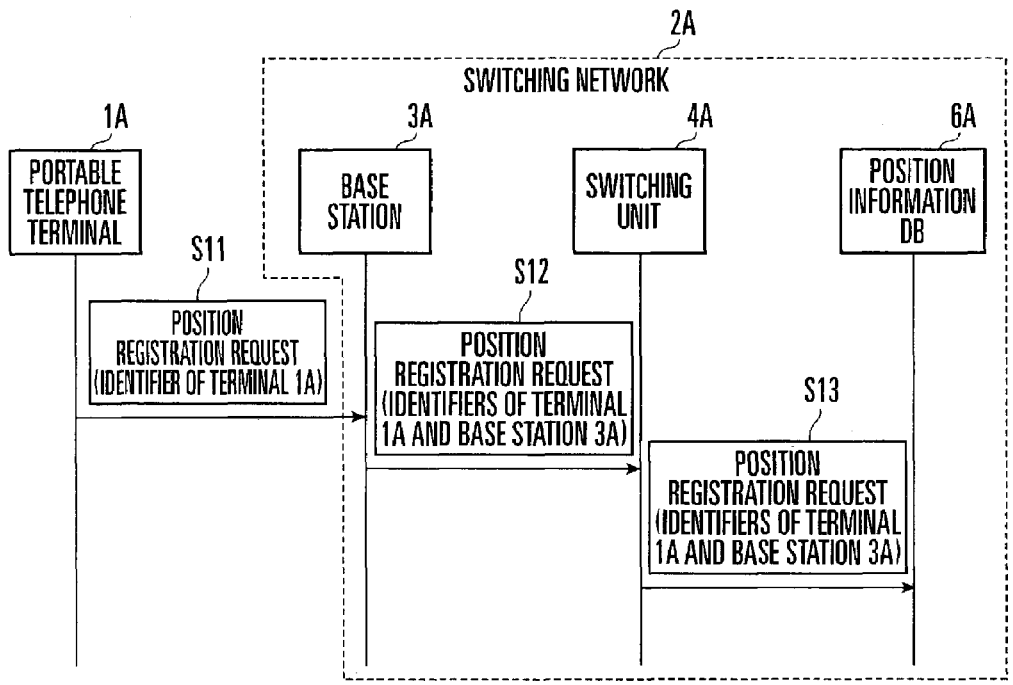
FIG. 5 is a sequence chart showing position registration operation by the portable telephone system in FIG. 1.

Position registration operation when the portable telephone terminal 1A is connected to the base station 3A of the switching network 2A will be described with reference to FIG. 5.

If the portable telephone terminal 1A detects that the base station 3A is in a radio communicable state, the portable telephone terminal 1A transmits a position registration request to the base station 3A (step S11). The position registration request contains a terminal identifier assigned to the portable telephone terminal 1A. As shown in FIG. 3C, the terminal identifier is made up of two identifiers: a terminal-specific identifier ID1 which is assigned to each portable telephone terminal and stored in the nonvolatile memory 17, and a switching network identifier ID2 assigned to each switching network. The terminal-specific identifier ID1 is a telephone number itself or a value convertible into a telephone number by a switching unit.

Upon reception of the position registration request transmitted from the portable telephone terminal 1A, the base station 3A transmits to the switching unit 4A a position registration request obtained by adding the identifier of the base station 3A to position registration information (step S12). The identifier of the base station 3 is a unique identifier assigned to each base station. Upon reception of the position registration request from the base station 3A, the switching unit 4A transmits the contents of the received position registration request as a position registration request to the position information DB 6A (step S13). Upon reception of the position registration request from the switching unit 4A, the position information DB 6A registers the received terminal identifier and base station identifier in association with each other.

<Position Registration Cancellation Operation>

Figure 6:
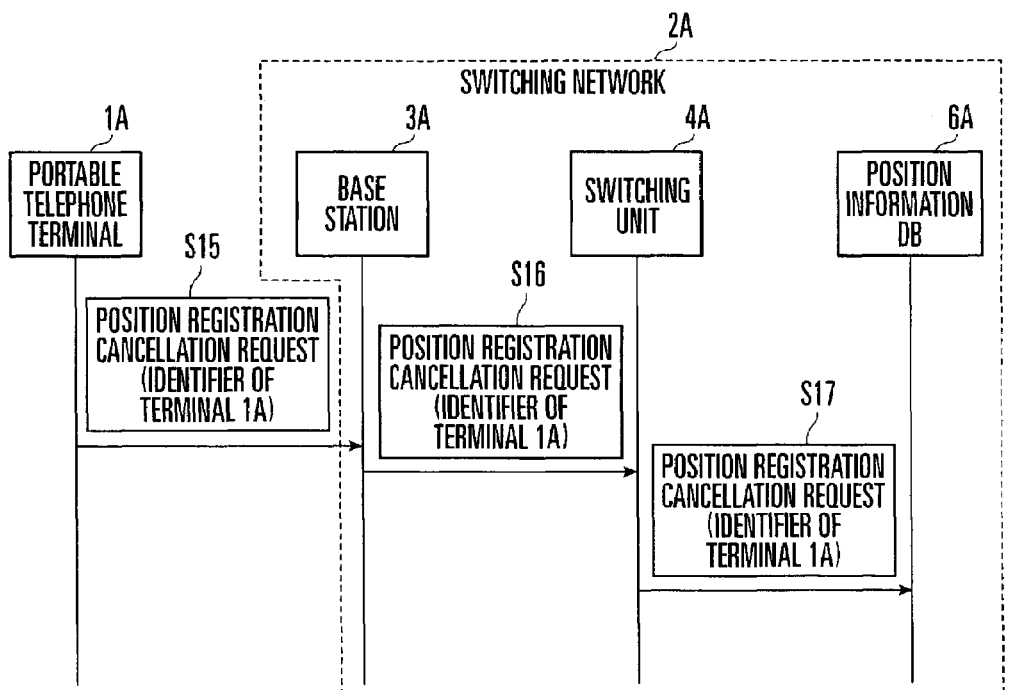
FIG. 6 is a sequence chart showing position registration cancellation operation by the portable telephone system in FIG. 1.

Position registration cancellation operation when the portable telephone terminal 1A is to be disconnected from the connected base station 3 will be explained with reference to FIG. 6.

When degradation in radio status with the connected base station 3A is detected or operation of, e.g., turning off the power supply is to be performed, the portable telephone terminal 1A transmits a position registration cancellation request to the base station 3A (step S15). The position registration cancellation request contains the terminal identifier of the portable telephone terminal 1A.

Upon reception of the position registration cancellation request from the portable telephone terminal 1A, the base station 3A transmits the contents of the received position registration cancellation request as a position registration cancellation request to the switching unit 4A (step S16). Upon reception of the position registration cancellation request from the base station 3A, the switching unit 4A transmits the contents of the received position registration cancellation request as a position registration cancellation request to the position information DB 6A (step S17). Upon reception of the position registration cancellation request from the switching unit 4A, the position information DB 6A searches the database using, as a key, the identifier ID1 of the portable telephone terminal 1A contained in the received position registration cancellation request, and updates position information of the portable telephone terminal 1A to "dead space".

<Time Difference Inquiry Operation (Successful)>

Figure 7:
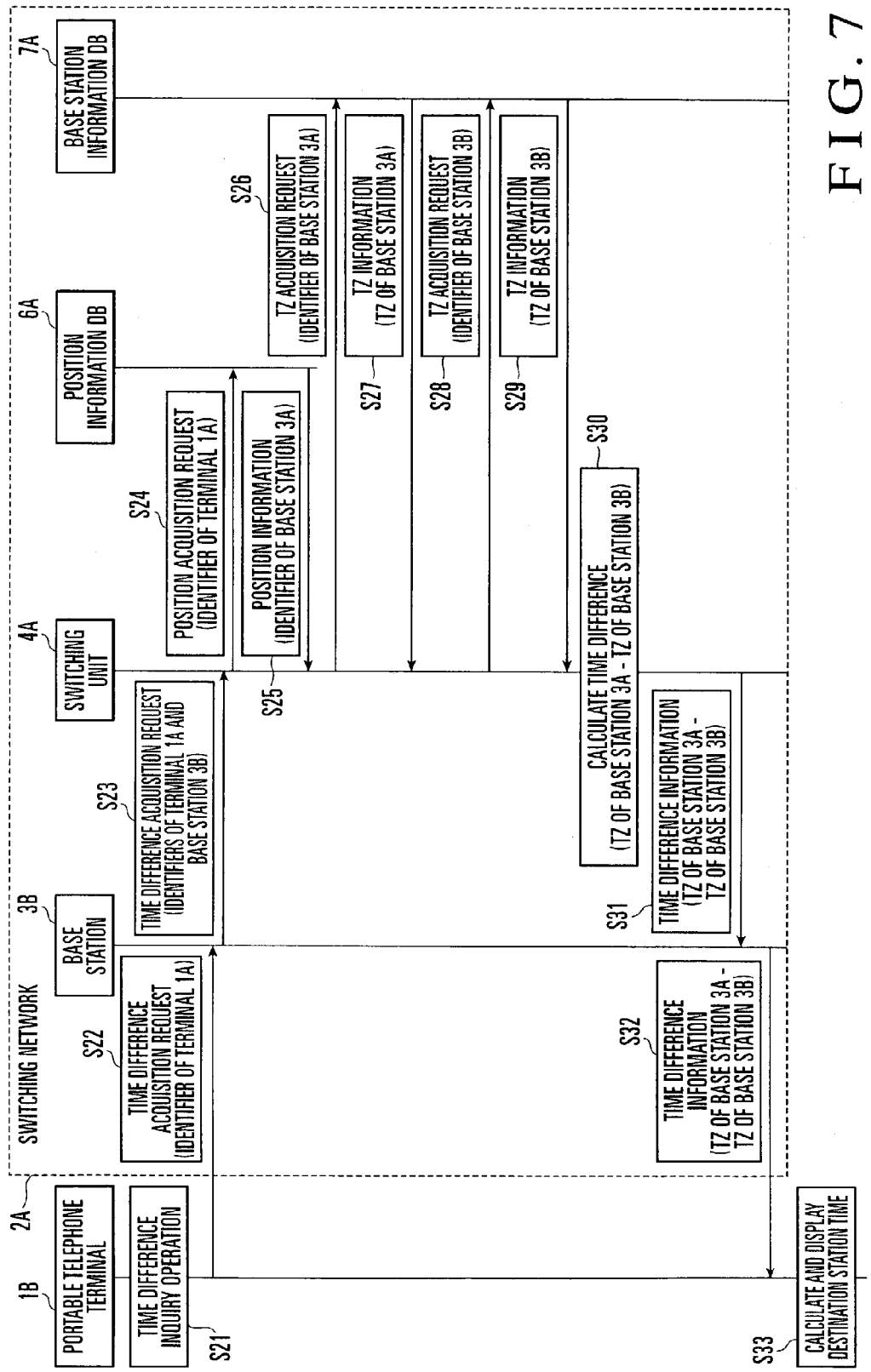
FIG. 7 is a sequence chart showing time difference inquiry operation (successful) by the portable telephone system in FIG. 1;.

Inquiry operation of the portable telephone terminal 1B for time difference information of the portable telephone terminal 1A belonging to the same switching network will be explained with reference to FIG. 7. Inquiry operation will exemplify a case wherein the portable telephone terminal 1A is connected to any base station within the switching network 2A to which the portable telephone terminal 1B belongs.

If the user of the portable telephone terminal 1B executes time difference inquiry operation (step S21), the portable telephone terminal 1B transmits a time difference acquisition request to the connected base station 3B (step S22). The terminal identifier (telephone number) of the destination portable telephone terminal 1A whose time difference is to be obtained is added to the time difference acquisition request.

The base station 3B transmits to the switching unit 4A a time difference acquisition request obtained by adding the identifier of the base station 3B to the contents of the time difference acquisition request received from the portable telephone terminal 1B (step S32). Upon reception of the time difference acquisition request, the switching unit 4A transmits to the position information DB 6A a position acquisition request which contains the identifier of the terminal 1A extracted from the time difference acquisition request (step S24). The position information DB 6A searches the database using, as a key, the identifier of the terminal 1A contained in the position acquisition request, adds to the searched position information the base station identifier of the base station 3A connected to the portable telephone terminal 1A, and transmits the position information to the switching unit 4A (step S25).

The switching unit 4A extracts the identifier of the base station 3A from the received position information, adds the extracted identifier to a TZ acquisition request, and transmits the TZ acquisition request to the base station information DB 7A (step S26). The base station information DB 7A searches the database using, as a key, the base station identifier contained in the TZ acquisition request received from the switching unit 4A, adds time zone information of the base station 3A to TZ information, and transmits the TZ information to the switching unit 4A (step S27). The switching unit 4A which has received the time zone information of the base station 3A transmits to the base station information DB 7A a TZ acquisition request to which the identifier of the base station 3B is added (step S28). The base station information DB 7A which has received the TZ acquisition request transmits to the switching unit 4A the TZ information to which the time zone information of the base station 3B is added (step S29).

The switching unit 4A which has acquired the two pieces of time zone information of the base stations 3A and 3B calculates the time difference between the base stations 3A and 3B by an equation (the time zone of the base station 3A—the time zone of the base station 3B) (step S30). The calculation result is added to time difference information, and transmitted to the base station 3B (step S31). The base station 3B transmits the contents of the time difference information received from the switching unit 4A as time difference information to the portable telephone terminal 1B (step S32). Upon reception of the time difference information, the portable telephone terminal 1B calculates the time of the portable telephone terminal 1A from the time difference contained in the received time difference information and the current time obtained from the timepiece 13, and displays the time of the portable telephone terminal 1A as a destination time on the display 12 (step S33). Accordingly, the user of the portable telephone terminal 1B can recognize the current time of the portable telephone terminal 1A.

<Time Difference Inquiry Operation (Failed)>

Figure 8:
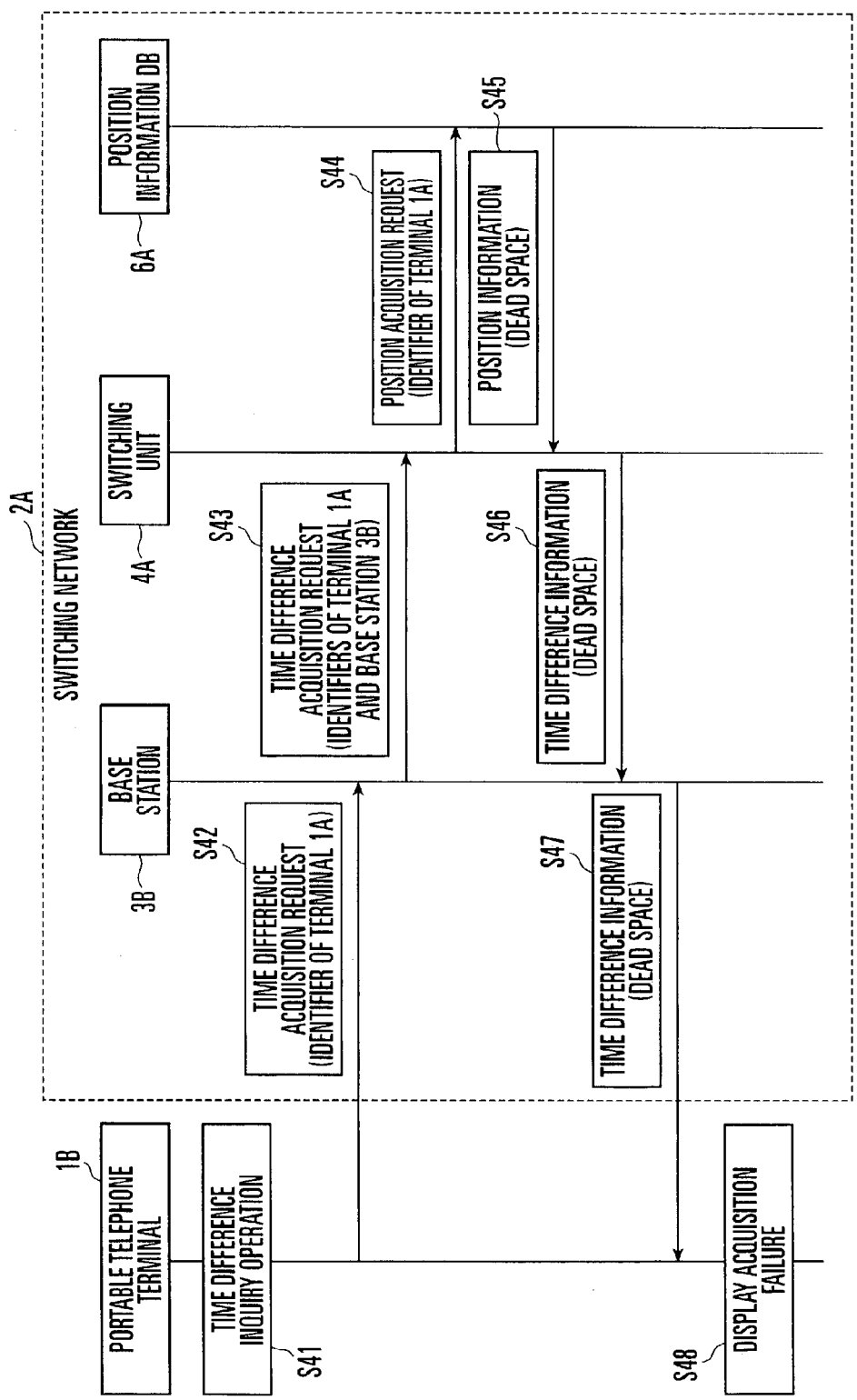
FIG. 8 is a sequence chart showing time difference inquiry operation (failed) by the portable telephone system in FIG. 1.

Operation when position information is indefinite because the destination portable telephone terminal 1A whose time difference information is to be inquired by the portable telephone terminal 1B is in the dead space or the power supply is OFF will be explained with reference to FIG. 8.

If the user of the portable telephone terminal 1B executes time difference inquiry operation (step S41), the portable telephone terminal 1B transmits a time difference acquisition request to the connected base station 3B (step S42). The terminal identifier (telephone number) of the destination portable telephone terminal 1A whose time difference is to be obtained is added to the time difference acquisition request.

Upon reception of the time difference acquisition request from the portable telephone terminal 1B, the base station 3B transmits to the switching unit 4A in step S43 a time difference acquisition request obtained by adding the identifier of the base station 3B to the contents of the time difference acquisition request. Upon reception of the time difference acquisition request, the switching unit 4A transmits to the position information DB 6A a position acquisition request which contains the identifier of the destination terminal 1A extracted from the time difference acquisition request (step S44). The position information DB 6A searches the database using, as a key, the identifier of the destination terminal 1A contained in the received position acquisition request. At this time, if the portable telephone terminal 1A is not connected to any base station, "dead space" is recorded as position information in the position DB 6A. Thus, the position DB 6A adds "dead space" to position information, and transmits the position information to the switching unit 4A (step S45).

Upon reception of the position information, the switching unit 4A adds "dead space" to the time difference information on the basis of the received position information "dead space", and transmits the time difference information to the base station 3B (step S46). The base station 3B transmits the contents of the received time difference information as time difference information to the portable telephone terminal 1B (step S47). Since the received time difference information represents "dead space", the portable telephone terminal 1B displays a failure in acquiring the time difference of the destination on the display 12, and notifies the user of a message to this effect (step S48).

<Position Registration Operation (Roaming Destination Switching Network)>

Figure 9:
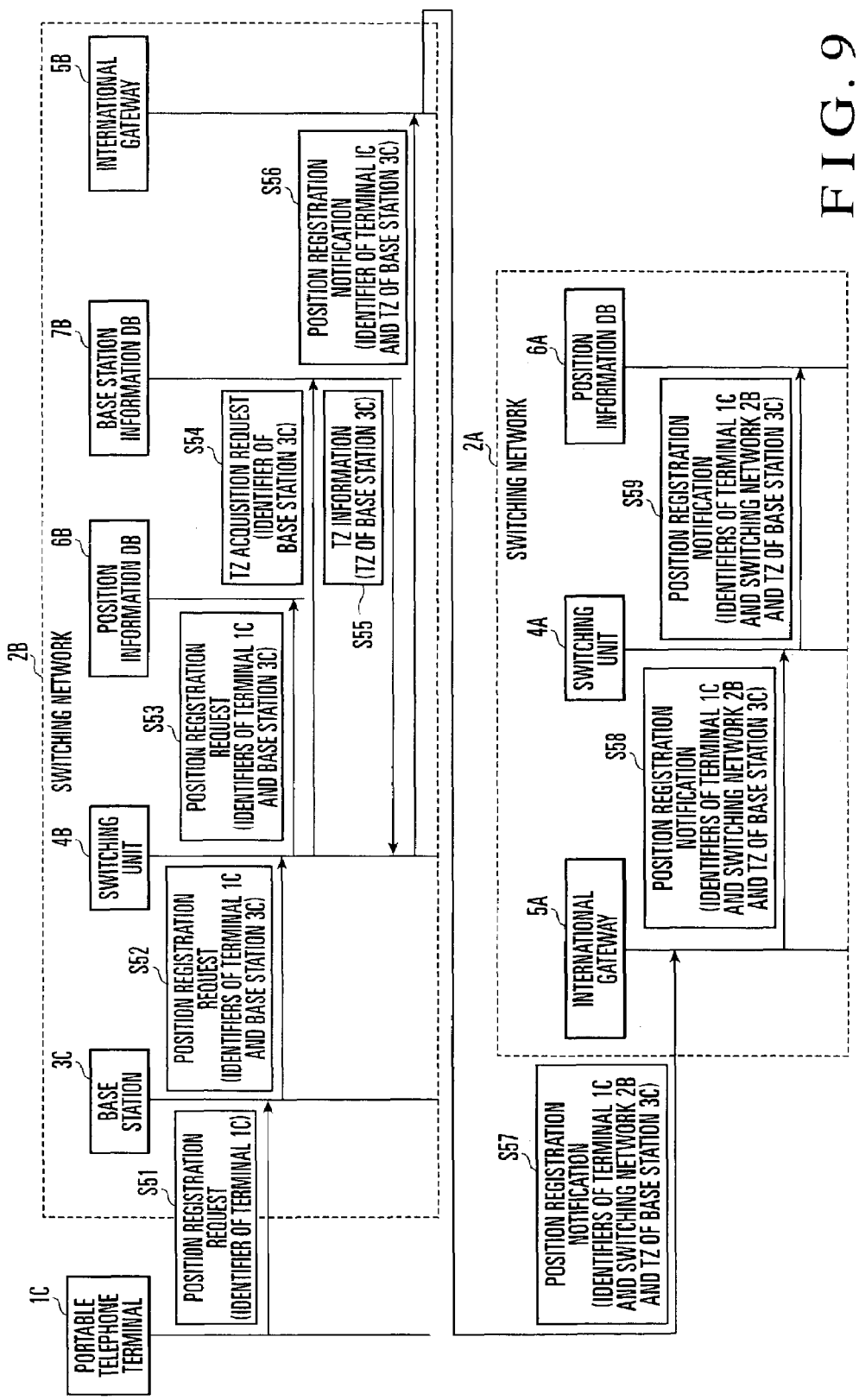
FIG. 9 is a sequence chart showing position registration operation (roaming destination switching network) by the portable telephone system in FIG. 1.

Operation when the portable telephone terminal 1C belonging to the switching network 2A is to be connected to the base station 3C of the switching network 2B will be described with reference to FIG. 9. This is concerned with so-called roaming operation, and is control of allowing the use of a portable telephone terminal in a switching network different from a switching network provided by a contracted carrier.

If the portable telephone terminal 1C detects a radio communicable state with the base station 3C, the portable telephone terminal 1C transmits a position registration request to the base station 3C (step S51). The position registration request contains a terminal identifier assigned to the portable telephone terminal 1C. Since the portable telephone terminal 1C belongs to the switching network 2A, the switching network identifier contained in the identifier of the destination terminal 1C represents the switching network 2A. The base station 3C transmits to the switching unit 4B a position registration request obtained by adding the identifier of the base station 3C to the position registration request received from the portable telephone terminal 1C (step S52). The identifier of the base station 3C is a unique identifier assigned to each base station.

Upon reception of the position registration request from the base station 3C, the switching unit 4B transmits the contents of the received position registration request as a position registration request to the position information DB 6B (step S53). The position information DB 6B creates a database record for the portable telephone terminal 1C, and registers a pair of the received identifiers of the terminal 1C and base station 3C in the database. This database record must be newly created because the position information database record of a portable telephone terminal belonging to another switching network does not generally exist in the roaming destination switching network.

The switching unit 4B reads out the switching network identifier from the identifier of the destination terminal 1C, if the readout identifier is different from the identifier of the switching network 2B, transmits a TZ acquisition request to the base station information DB 7B (step S54), and receives TZ information from the base station information DB 7B (step S55). The TZ information contains time zone information of the base station 3C.

The switching unit 4B adds the time zone information of the base station 3C to a position registration notification together with the identifier of the destination terminal 1C, and transmits the position registration notification to the international gateway 5B (step S56). Upon reception of the position registration notification, the international gateway 5B transmits to the international gateway 5A of the switching network 2A a position registration information obtained by adding the identifier of the switching network 2B to the received position registration notification (step S57).

Upon reception of the position registration notification from the international gateway 5B, the international gateway 5A transmits the contents of the received position registration notification as a position registration notification to the switching unit 4A of the switching network 2A (step S58). Upon reception of the position registration notification, the switching unit 4A extracts the identifier of the destination terminal 1C, the identifier of the switching network 2B, and the time zone of the base station 3C that are contained in the position registration notification, adds the pieces of extracted information to a position registration request, and transmits the position registration request to the position information DB 6A (step S59). The position information DB 6A records the switching network 2B as position information and the time zone of the base station 3C as a time zone in the database record corresponding to the portable telephone terminal 1C.

<Position Registration Cancellation Operation (Roaming Destination Switching Network)>

Figure 10:
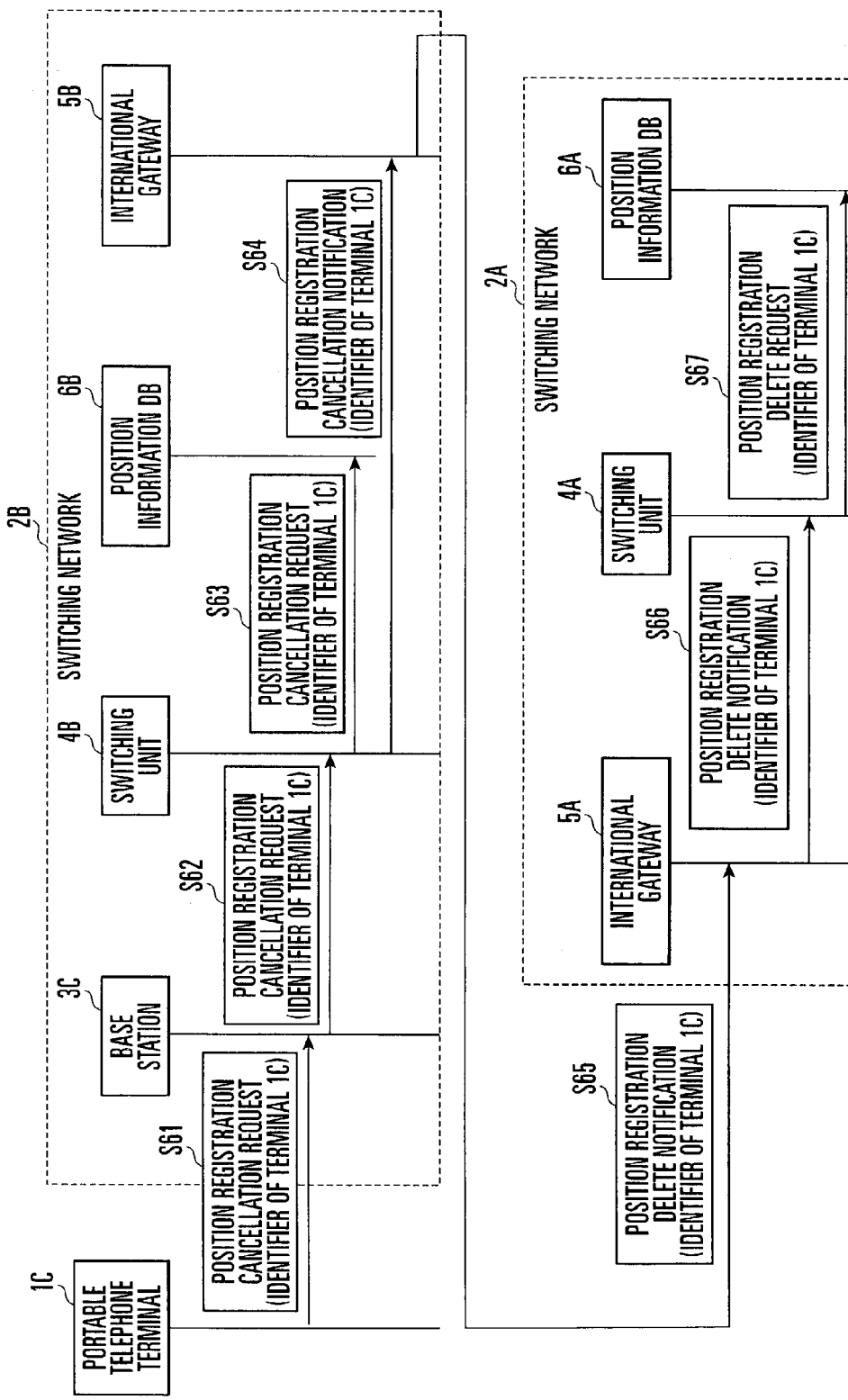
FIG. 10 is a sequence chart showing position registration cancellation operation (roaming destination switching network) by the portable telephone system in FIG. 1.

Operation when the portable telephone terminal is to be disconnected from the roaming destination switching network will be explained with reference to FIG. 10.

When degradation in radio status with the connected base station 3C is detected or operation of, e.g., turning off the power supply is to be performed, the portable telephone terminal 1C transmits a position registration cancellation request to the base station 3C (step S61). The position registration cancellation request contains the terminal identifier of the portable telephone terminal 1C. Upon reception of the position registration cancellation request, the base station 3C transmits the contents of the position registration cancellation request as a position registration cancellation request to the switching unit 4B (step S62). The switching unit 4B transmits the contents of the received position registration cancellation request as a position registration cancellation request to the position information DB 6B (step S63).

Upon reception of the position registration cancellation request, the position information DB 6B searches the database using, as a key, the ID of the portable telephone terminal 1C (identifier of the terminal 1C) contained in the received position registration delete request, and deletes the target record. Subsequent to transmission of the position registration cancellation request to the position information DB 6B, the switching unit 4B transmits a position registration cancellation request to the international gateway 5B (step S64). Upon reception of the position registration cancellation request, the international gateway 5B extracts a switching network identifier from the identifier of the destination terminal 1C contained in the received position registration cancellation request, and transmits a position registration delete notification to the international gateway 5A of the switching network 2A represented by the switching network identifier (step S65).

Upon reception of the position registration delete notification, the international gateway 5A of the switching network 2A transmits the contents of the received position registration delete notification as a position registration delete notification to the switching unit 4A of the switching network 2A (step S66). Upon reception of the position registration delete notification from the international gateway 5A, the switching unit 4A transmits a position registration delete request based on the position registration delete notification to the position information DB 6A (step S67). The position information DB 6A searches the database on the basis of the identifier of the designated destination terminal 1C, and rewrites position information in the database record to "dead space".

<Time Difference Inquiry Operation (In Destination Terminal Roaming)>

Figure 11:
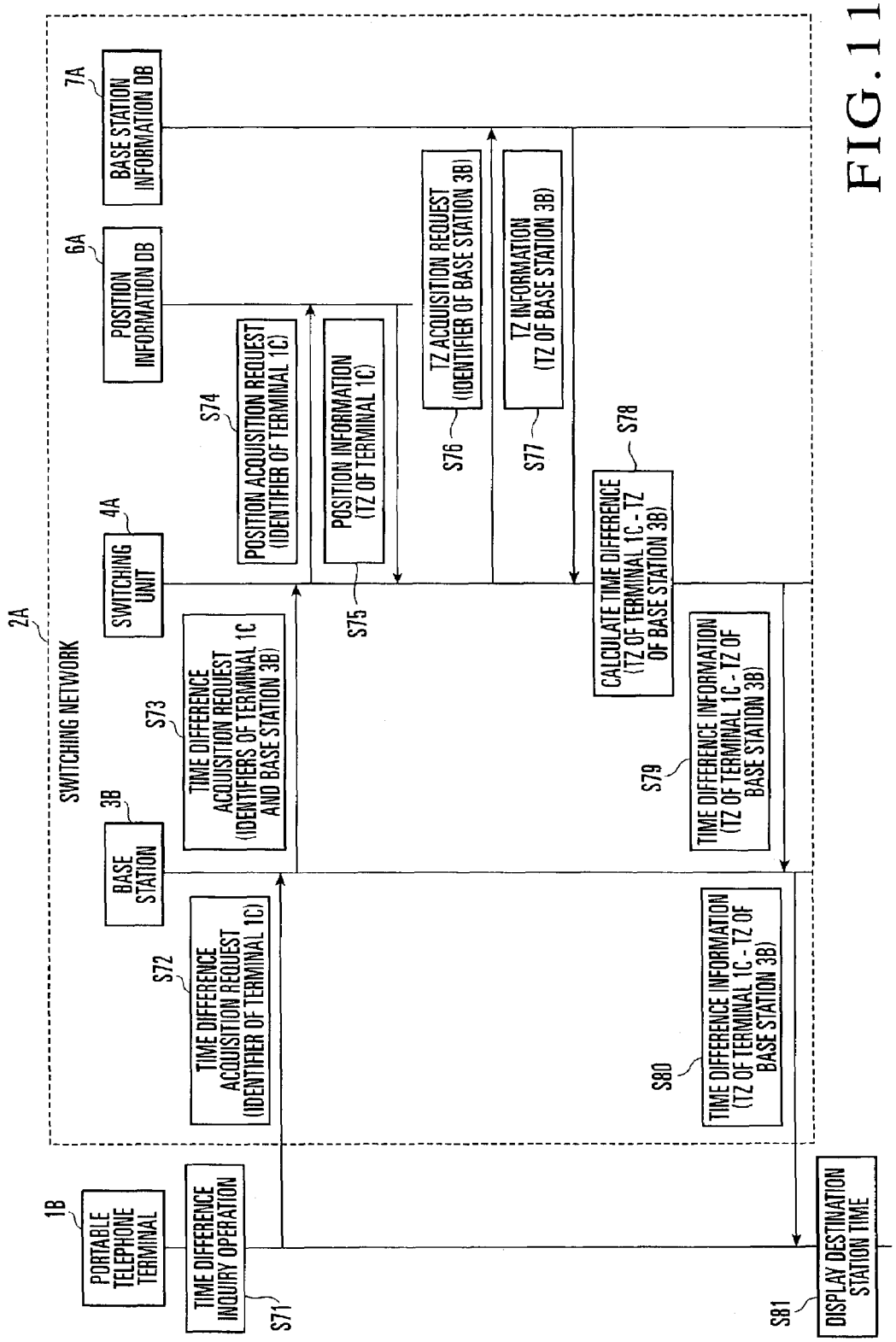
FIG. 11 is a sequence chart showing time difference inquiry operation (in destination terminal roaming) by the portable telephone system in FIG. 1.

Time difference inquiry operation of the portable telephone terminal 1B while the destination portable telephone terminal 1C is connected (roams) to another switching network will be explained with reference to FIG. 11.

If the user of the portable telephone terminal 1B executes time difference inquiry operation (step S71), the portable telephone terminal 1B transmits a time difference acquisition request to the connected base station 3B (step S72). The time difference acquisition request contains the terminal identifier (telephone number) of the destination terminal 1C whose time difference is to be obtained.

Upon reception of the time difference acquisition request from the portable telephone terminal 1B, the base station 3B transmits to the switching unit 4A a time difference acquisition request obtained by adding the identifier of the base station 3B to the contents of the time difference acquisition request (step S73). Upon reception of the time difference acquisition request from the base station 3B, the switching unit 4A transmits to the position information DB 6A a position acquisition request which contains the identifier of the destination terminal 1C extracted from the time difference acquisition request (step S74).

The position information DB 6A searches the database using, as a key, the identifier of the destination terminal 1C contained in the position acquisition request. Since position information of the portable telephone terminal 1C is "switching network 2B", the position information DB 6A adds the stored time zone information of the portable telephone terminal 1C to the position information, and transmits the position information to the switching unit 4A (step S75). The switching unit 4A which has received the time zone information of the portable telephone terminal 1C transmits to the base station information DB 7A a TZ acquisition request obtained by adding the identifier of the base station 3B (step S76). Upon reception of the TZ acquisition request, the base station information DB 7A transmits TZ information which contains the time zone information of the base station 3B to the switching unit 4A (step S77).

The switching unit 4A which has acquired the two pieces of time zone information of the portable telephone terminal 1C and base station 3B calculates the time difference between the portable telephone terminal 1C and the base station 3B by an equation (the time zone of the portable telephone terminal 1C—the time zone of the base station 3B) (step S78), adds the calculation result to time difference information, and transmits the time difference information to the base station 3B (step S79). The base station 3B transmits the contents of the time difference information received from the switching unit 4A as time difference information to the portable telephone terminal 1B (step S80). Upon reception of the time difference information, the portable telephone terminal 1B calculates the current time of the portable telephone terminal 1C on the basis of the time difference acquired from the received time difference information and the current time obtained from the timepiece 13, and displays the calculation result on the display 12 (step S81). Hence, the user is notified of the time of the destination.

Note that when the portable telephone terminal 1C issues a position registration cancellation request as described above and position information corresponding to the portable telephone terminal 1C in the position information DB 6A is rewritten to "dead space", "dead space" is transmitted as position information from the position information DB 6A. In this case, upon reception of the position information "dead space", the switching unit 4A adds "dead space" to time difference information, and transmits the time difference information to the base station 3B. Upon reception of the time difference information, the base station 3B transmits the contents of the time difference information as time difference information to the portable telephone terminal 1B without any change. Upon reception of the time difference information "dead space", the portable telephone terminal 1B displays a failure in acquiring the time difference of the destination on the display 12, and notifies the user of a message of this effect.

Figure 12A:
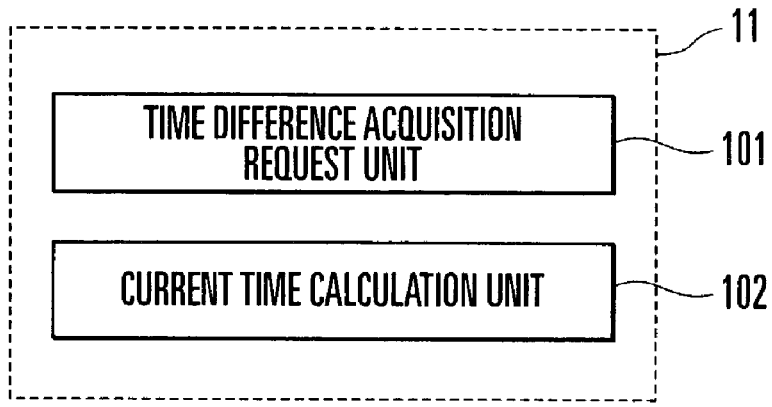
FIG. 12A is a functional block diagram showing a controller in FIG. 2.
Figure 12B:
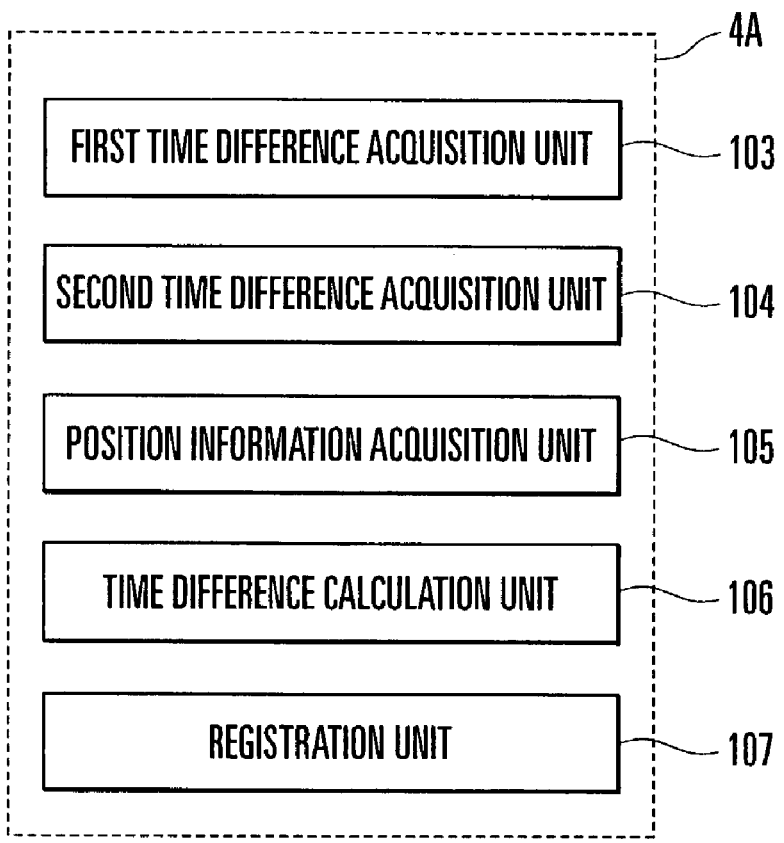
FIG. 12B is a functional block diagram showing a switching unit in FIG. 1.

FIGS. 12A and 12B show the functional blocks of the controller 11 of the portable telephone terminal 1A and the functional blocks of the switching unit 4A of the switching network 2A. As shown in FIG. 12A, the controller 11 comprises a time difference acquisition request unit 101 which executes steps S1 (FIG. 4) and S21 (FIG. 7), and a current time calculation unit 102 which executes steps S5 (FIG. 4) and S33 (FIG. 7). The switching unit 4A comprises a first time difference acquisition unit 103 which executes steps S28 (FIG. 7) and S29 (FIG. 7), a second time difference acquisition unit 104 which executes steps S24 (FIG. 7) and S25 (FIG. 7), a position information acquisition unit 105 which executes steps S26 (FIG. 7) and S27 (FIG. 7), a time difference calculation unit 106 which executes step S30 (FIG. 7), and a registration unit 107 which executes steps S59 (FIG. 9) and S67 (FIG. 10).

In this manner, according to the above embodiment, the user of a portable telephone terminal can be notified of the current time of a destination terminal before origination regardless of the area to which the destination terminal moves and becomes connectable to a base station. In addition, the user can recognize that the destination terminal is in an incommunicable state, e.g., the dead space without calling the destination terminal. Even while the destination terminal is connected to a switching network other than one provided by a contracted carrier, the user of the originating portable telephone terminal can be notified of the current time of the destination terminal before origination.

The above embodiment has exemplified a speech communication portable telephone terminal, but the present invention can also be applied to a data communication portable terminal.

As has been described above, according to the present invention, an originating terminal can acquire the time difference from a destination terminal before origination regardless of the area to which the destination terminal moves as long as the destination terminal is connected by radio to the base station of this area. The originating terminal calculates the current time of the destination terminal from the acquired time difference and the current time of the timepiece, and displays the current time of the destination terminal on the display, thereby notifying the user of the current time of the destination terminal in advance.

Even while the destination terminal is connected to a switching network provided by a carrier different from a carrier with which the originating portable terminal contracts, the user can be notified of the current time of the destination terminal in advance.

What is claimed is:

1. A radio communication system comprising:
   first and second portable terminals each of which is assigned a unique identifier and has a display for displaying time information and time difference information and a timepiece for measuring current time; and
   a first switching network having first and second base stations which are assigned unique identifiers and perform radio communication with said first and second portable terminals, a first switching unit connected to said first and second base stations, a first database which stores positions of said first and second portable terminals in association with positions of said first and second base stations, and a second database which stores pieces of time difference information of said first and second base stations,
   wherein said first portable terminal comprises
   time difference acquisition request means for adding the identifier of said second portable terminal and issuing a time difference acquisition request for said second portable terminal to said first base station when said second portable terminal connected to said second base station is to be called via said first base station, and
   current time calculation means for calculating current time of said second portable terminal on the basis of time difference information sent from said first base station in response to the time difference acquisition request from said time difference acquisition request means and time information from said timepiece, and outputting the current time of said second portable terminal to said display,
   said first base station adds the identifier of said first base station to the time difference acquisition request containing a terminal identifier received from said first portable terminal, and transmits the time difference acquisition request to said first switching unit,
   said first switching unit comprises
   first time difference acquisition means for acquiring the time difference information of said first base station from said second database on the basis of the identifier of said first base station contained in the time difference acquisition request received from said first base station,
   position information acquisition means for acquiring position information of said second base station containing a base station identifier from said first database on the basis of the identifier of said second portable terminal contained in the time difference acquisition request received from said first base station,
   second time difference acquisition means for acquiring the time difference information of said second base station from said second database on the basis of the base station identifier contained in the position information of said second base station output from said position information acquisition means, and
   time difference calculation means for calculating a time difference between said first and second base stations by using pieces of time difference information output from said first and second time difference acquisition means, and transmitting a calculation result to said first portable terminal via said first base station.

2. The system according to claim 1, wherein
   said system further comprises a second switching network including a second switching unit,
   said first switching network comprises an international gateway which exchanges time difference information of a portable terminal with said second switching network,
   said second switching unit transmits, to said first switching network represented by a switching network identifier in response to a position registration request from said second portable terminal that contains the identifier of said second portable terminal and an identifier of said first switching network, a position registration notification containing time difference information of a receiving base station of said second switching network which has received the position registration request from said second portable terminal, and the identifier of said second portable terminal and the identifier of said first switching network which are contained in the position registration request, and
   said first switching unit comprises registration means for registering, as a position and time difference information of said second portable terminal represented by the terminal identifier in said first database, an identifier of said second switching network contained in the position registration notification received from said second switching network via said international gateway, and the time difference information of said receiving base station in said second switching network.

3. The system according to claim 2, wherein said second time difference acquisition means acquires the time difference information of said second portable terminal connected to said second switching network from said first database on the basis of the identifier of said second portable terminal contained in the time difference acquisition request from said first portable terminal.

4. The system according to claim 1, wherein
   said first switching unit comprises registration means for registering dead space information of said second portable terminal in said first database in response to a position registration cancellation request from said second portable terminal, said time difference calculation means transmits the dead space information as time difference information to said first portable terminal when the dead space information of said second portable terminal is acquired from said first database in response to the time difference acquisition request from said first portable terminal, and said first portable terminal displays on said display a message that time difference acquisition fails.

5. A destination portable terminal time identification method comprising the steps of:

when a first portable terminal connected to a first base station is to call a second portable terminal connected to a second base station, transmitting a time difference acquisition request for the second portable terminal that contains an identifier of the second portable terminal from the first portable terminal;

when the first base station receives the time difference acquisition request from the first portable terminal, adding an identifier of the first base station to the time difference acquisition request and transmitting the time difference acquisition request from the first base station;

when a first switching unit receives the time difference acquisition request from the first base station, on the basis of a base station identifier contained in the time difference acquisition request, acquiring time difference information of the first base station from a position information database which stores positions of the first and second portable terminals in association with positions of the first and second base stations;

when the first switching unit receives the time difference acquisition request from the first base station, on the basis of a terminal identifier contained in the time difference acquisition request, acquiring position information of the second base station from a base station database which stores pieces of time difference information of the first and second base stations;

acquiring the time difference information of the second base station from the position information database on the basis of the base station identifier contained in the acquired position information;

calculating a time difference between the first and second base stations by using the pieces of acquired time difference information, and transmitting a calculation result from the first switching unit to the first portable terminal via the first base station; and calculating and displaying current time of the second portable terminal on the basis of the calculation result received from the first switching unit and time information measured by the first portable terminal.

6. The method according to claim 5, further comprising:

in response to a position registration request from the second portable terminal connected to a second switching network different from a first switching network to which the first portable terminal belongs, transmitting, to the first switching network represented by a switching network identifier, a position registration notification containing time difference information of a receiving base station of the second switching network which has received the position registration request from the second portable terminal, and the identifier of the second portable terminal and an identifier of the first switching network which are contained in the position registration request; and when the first switching network receives the position registration notification from the second switching network, registering in the position information database the identifier of the first switching network and the time difference information of the receiving base station of the second switching network which are contained in the position registration notification, as a position and time difference information of the second portable terminal represented by the terminal identifier.

7. The method according to claim 6, further comprising:

acquiring the time difference information of the second portable terminal connected to the second switching network from the position information database on the basis of the terminal identifier contained in the time difference acquisition request in response to the time difference acquisition request from the first portable terminal; and calculating the time difference between the first and second portable terminals by using the time difference information of the first base station and the time difference information of the second portable terminal connected to the second switching network.

8. The method according to claim 6, further comprising:

registering dead space information of the second portable terminal in the position information database in response to a position registration cancellation request from the second portable terminal;

transmitting, as time difference information, the dead space information of the second portable terminal acquired from the position information database in response to the time difference acquisition request from the first portable terminal; and displaying by the first portable terminal a message that time difference acquisition fails.

* * * * *